United States Patent
Tsai et al.

(10) Patent No.: US 10,750,728 B1
(45) Date of Patent: Aug. 25, 2020

(54) METHOD FOR IMPROVING THE QUALITY OF STURGEON MEAT

(71) Applicant: TAMSUO Aquatic Products Co., Ltd., Yilan County (TW)

(72) Inventors: Chi-Lin Tsai, Yilan County (TW); Cheng-Nan Chung, Yilan County (TW)

(73) Assignee: TAMSUO AQUATIC PRODUCTS CO., LTD., Su'ao Township, Yilan County (TW)

( * ) Notice: Subject to any disclaimer, the term of this patent is extended or adjusted under 35 U.S.C. 154(b) by 0 days.

(21) Appl. No.: 16/816,758

(22) Filed: Mar. 12, 2020

(30) Foreign Application Priority Data

Apr. 10, 2019 (TW) .............................. 108112564 A

(51) Int. Cl.
*A01K 61/10* (2017.01)
*A01K 63/04* (2006.01)
*C02F 1/28* (2006.01)
*C02F 101/12* (2006.01)

(52) U.S. Cl.
CPC .............. *A01K 61/10* (2017.01); *A01K 63/04* (2013.01); *C02F 1/283* (2013.01); *C02F 2101/12* (2013.01)

(58) Field of Classification Search
CPC .................................. A01K 61/10; A01K 63/04
See application file for complete search history.

(56) References Cited

U.S. PATENT DOCUMENTS

| | | | | |
|---|---|---|---|---|
| 3,777,709 A | * | 12/1973 | Anderson | A01K 61/10 119/217 |
| 6,016,770 A | * | 1/2000 | Fisher | A01K 63/04 119/215 |
| 6,443,097 B1 | * | 9/2002 | Zohar | A01K 61/10 119/217 |
| 2007/0151522 A1 | * | 7/2007 | Brauman | A01K 61/20 119/228 |

FOREIGN PATENT DOCUMENTS

| | | |
|---|---|---|
| CN | 103329825 A | 10/2013 |
| TW | 201713208 A | 4/2017 |

OTHER PUBLICATIONS

Edwin J. Nikilitschek and David H. Secor, Dec. 1, 2009, Journal of Marine Biology and Ecology, vol. 381, Dissolved oxygen, temperature and salinity effects on the ecophysiology and survival of juvenile Atlantic sturgeon in estuarine waters: I. Laboratory results (Year: 2009).*

* cited by examiner

*Primary Examiner* — Christopher D Hutchens
(74) *Attorney, Agent, or Firm* — Muncy, Geissler, Olds & Lowe, P.C.

(57) ABSTRACT

The present invention provides a method for improving the quality of sturgeon meat by using deep seawater with low temperature, clean and rich nutrient characteristics to acclimate the sturgeons for at least 2 weeks. The salinity of the deep seawater is adjusted to 10-20 ppt, water temperature below 20° C. by adding fresh water. Thereby, the taste and flavor of the sturgeon meat can be significantly improved, and the value thereof can also be increased.

6 Claims, 4 Drawing Sheets

METHOD FOR IMPROVING THE QUALITY OF STURGEON MEAT

BACKGROUND OF THE INVENTION

Field of the Invention

The present invention relates generally to a method for improving the quality of sturgeon meat.

Description of the Prior Art

The suitable water temperature for sturgeon growth is between 15° C. and 26° C. However, due to the high summer water temperature in the flat land of Taiwan, the sturgeon breeding area is limited to mountainous areas or a few flat land areas where low temperature fresh water can be obtained.

The freshwater sturgeon meat also has the unique fishy smell commonly found in freshwater fish. Without extraordinary water quality management, the fishy smell is not easy to remove, which affects product sales.

Some people have proposed the idea of exposing sturgeons in surface seawater for salinity acclimation. However, the temperature of the surface seawater varies in different seasons. More specifically, the surface seawater temperature in summer is way too high for the survival of sturgeons. During the acclimation period, bacteria and fine algae contained in the surface seawater will rapidly propagate in large numbers, in which it affects the survival of sturgeons. Besides, the high temperature environment also affects the quality of the sturgeon meat.

SUMMARY OF THE INVENTION

In view of the foregoing, it is an object of the present invention to provide a processing method for improving the quality of sturgeon meat.

To achieve the above and other objectives, the present invention provides a method for improving the quality of sturgeon meat, including the following steps: cultivating sturgeons in freshwater environment til the sturgeons reach sexual maturity and each of the sturgeons has at least 1 kg of weight; and acclimating the cultivated sturgeons for at least 2 weeks in a mixed saline water having a salinity between 10 ppt and 20 ppt while the temperature of the mixed saline water is maintained below 20° C.; wherein the mixed saline water is a mixture of deep seawater and fresh water.

Through the above-mentioned treatment method, we noted that the sturgeon survival during the acclimation is improved. In addition, we also unexpectedly found that the quality of the sturgeon meat is significantly improved. During a customer evaluation, the sturgeon meat from the sturgeons treated by the present invention is more superior than that from untreated sturgeons in all the evaluated aspects, such as smell, taste and overall preference, showing that the present invention can indeed significantly improve the mouthfeel and flavor of the sturgeon meat, thereby increasing the value of the products.

DETAILED DESCRIPTION OF THE PREFERRED EMBODIMENTS

Figure 1:
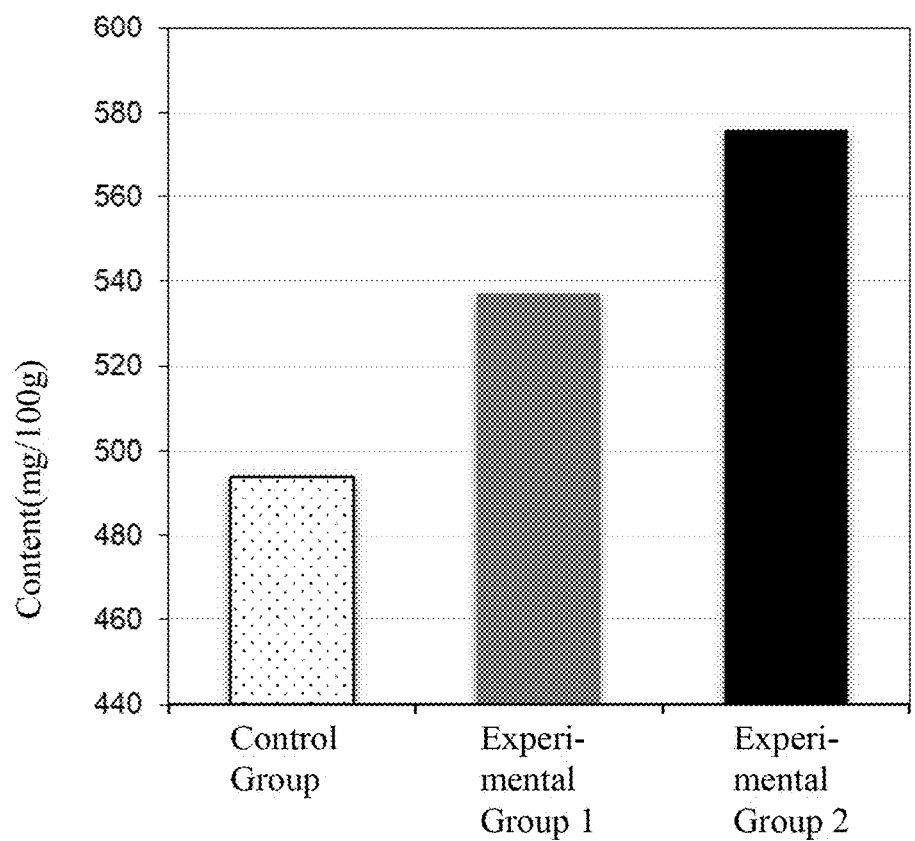
FIG. 1 is a detection chart of total amino acid content of the sturgeon meat.

The present invention discloses a method for improving the quality of sturgeon meat, including the following steps:

(1) Cultivating sturgeons in freshwater environment til the sturgeons reach sexual maturity and each of the sturgeons has at least 1 kg of weight; in possible embodiments, the sturgeon species can be selected from but not limited to *Huso huso*, *Huso dauricus*, *Acipenser baerii*, *Acipenser gueldenstaedti*, *Acipenser ruthenus*, *Acipenser transmontanus*, *Acipenser schrenckii*, *Acipenser sinensis*, *Polyodon spathula* and hybrids thereof; in a possible embodiment, the selected sturgeons are hybrids of *Acipenser baerii* and *Huso huso*; the freshwater environment is, for example, a freshwater aquaculture fish pond whose freshwater source may be river water, groundwater, mountain spring water or tap water, in which the freshwater source may be purified, such as dechlorinated with activated carbon;

(2) acclimating the cultivated sturgeons for at least 2 weeks in a mixed saline water having a salinity between 10-20 ppt (herein, "ppt" stands for "‰") while the temperature of the mixed saline water is maintained below 20° C.; the mixed saline water is a mixture of deep seawater and fresh water; in possible embodiments, the dissolved oxygen content of the mixed saline water is 5-7 mg/L; in possible embodiments, the mixed saline water is a mixture of the deep seawater and groundwater; in possible embodiments, the mixed saline water is a mixture of the deep seawater and tap water dechlorinated with activated carbon, thereby the mixed saline water can maintain the characteristics of low temperature, cleanliness and eutrophication; in possible embodiments, the cultivated sturgeons are acclimated in the mixed saline water for at least 4 weeks; in possible embodiments, the cultivated sturgeons are acclimated in the mixed saline water for at least 8 weeks; in possible embodiments, the salinity of the deep seawater is 34-35 ppt and the temperature thereof is about 4-17° C.; in possible embodiments, the temperature of the fresh water is 24-28° C. The deep seawater and the fresh water are mixed, depends on the original temperatures and salinities thereof, target temperature and salinity, into the mixed saline water with the salinity between 10 ppt and 20 ppt while the water temperature of the mixed saline water can be maintained below 20° C.; in possible embodiments, fresh water ice cubes are used as a part of the fresh water for adjusting the water temperature.

The deep seawater referred to in the present invention is seawater obtained from below 200 meters underwater (especially seawater in the thermocline layer of the ocean) in which the deep seawater having the characteristics of low temperature, cleanliness and eutrophication.

The following experimental groups and control group are used to obtain the muscle tissue of the sturgeons, to analyze the free amino acids, physical properties and sensory evaluation to illustrate the efficacies of the present invention.

Experimental group 1: *Acipenser baerii* and *Huso huso* hybrid sturgeons weighting 1-6 kg cultivated in freshwater and then acclimated in the mixed saline water with a salinity of 10 ppt for 8 weeks while the temperature of the mixed saline water is maintained below 20° C.

Experimental group 2: *Acipenser baerii* and *Huso huso* hybrid sturgeons weighting 1-6 kg cultivated in freshwater and then acclimated in the mixed saline water with a salinity of 20 ppt for 8 weeks while the temperature of the mixed saline water is maintained below 20° C.

Experimental group 3: *Acipenser baerii* and *Huso huso* hybrid sturgeons weighting 1-6 kg cultivated in freshwater and then acclimated in the mixed saline water with a salinity of 10 ppt for 4 weeks while the temperature of the mixed saline water is maintained below 20° C.

Experimental group 4: *Acipenser baerii* and *Huso huso* hybrid sturgeons weighting 1-6 kg cultivated in freshwater and then acclimated in the mixed saline water with a salinity of 20 ppt for 4 weeks while the temperature of the mixed saline water is maintained below 20° C.

Control group: *Acipenser baerii* and *Huso huso* hybrid sturgeons weighting 1-6 kg cultivated in freshwater.

Figure 2:
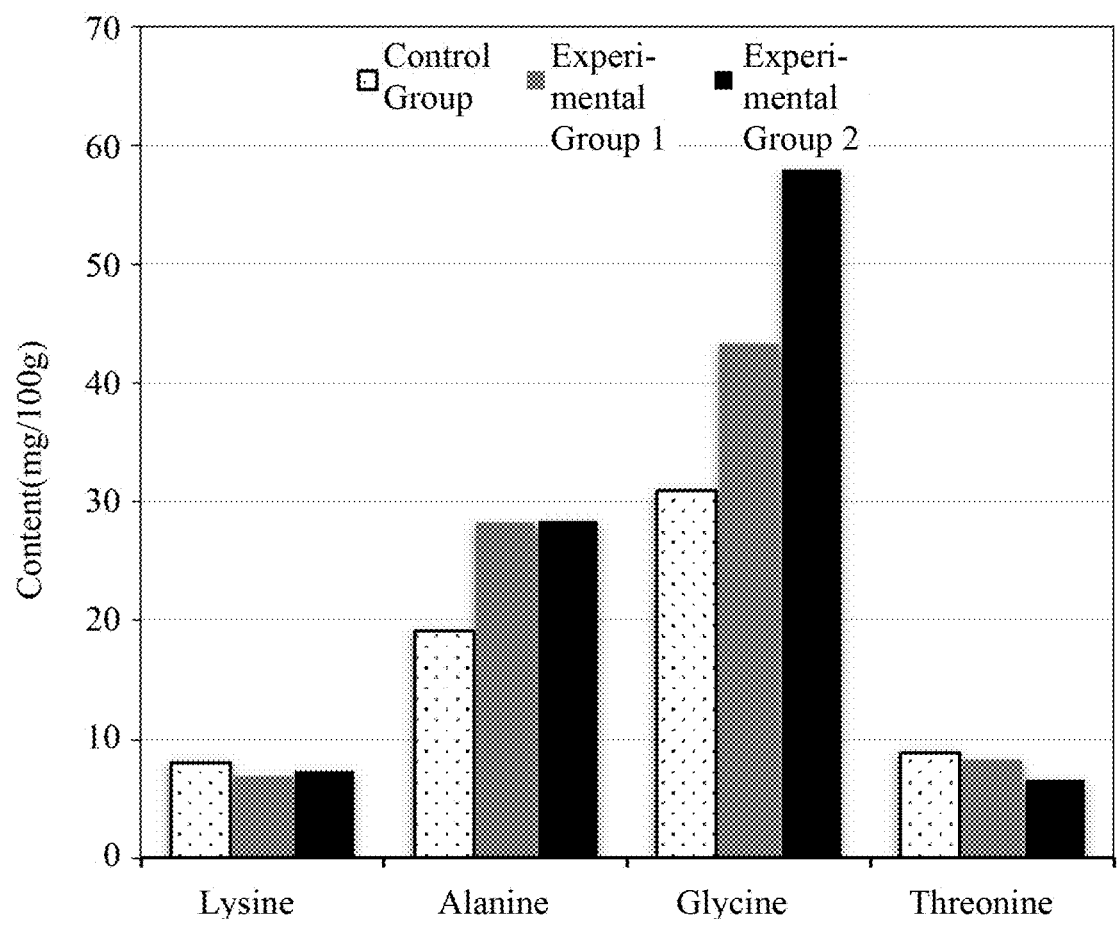
FIG. 2 is a content detection chart of bitter and sour taste appearing amino acid of the sturgeon meat.
Figure 3:
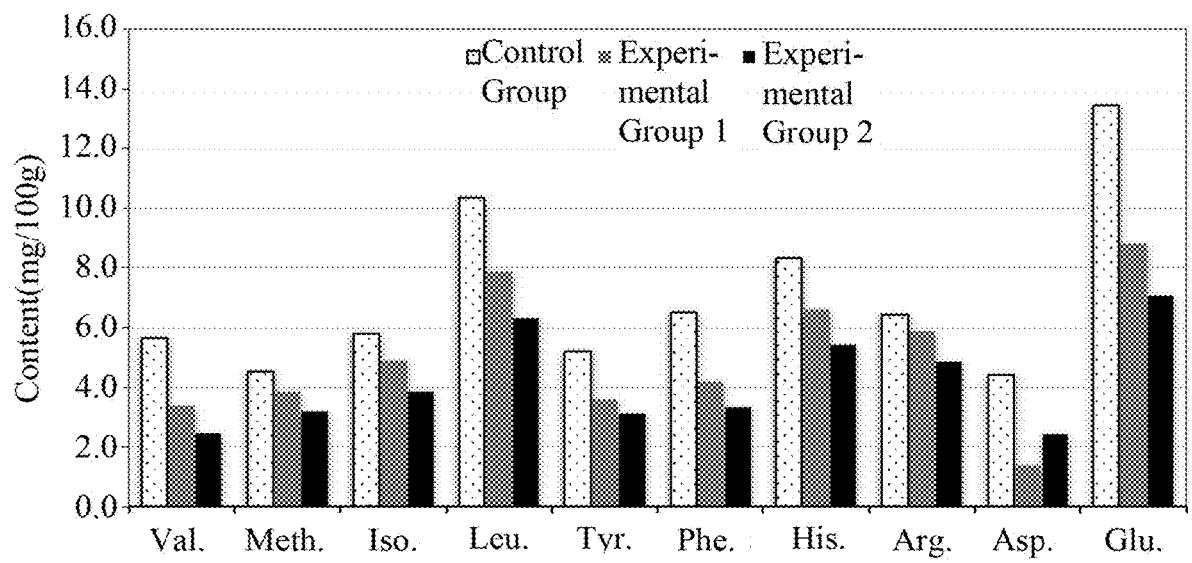
FIG. 3 is a content detection chart of sweet taste appearing amino acid of the sturgeon meat.

Please refer to FIG. 1, it is found that the sturgeon meat treated by the method of the present invention has a significantly higher total amino acid content than the control group. Further referring to FIG. 2, it is found that the contents of the two sweet taste amino acids, i.e. glycine and alanine, in the experimental groups 1 and 2 are significantly higher than those in the control group, in which the glycine content of the experimental group 2 is nearly twice that of the control group; further referring to FIG. 3, it is found that the contents of the eight bitter-tasting amino acids, i.e. valine (Val.), methionine (Meth.), isoleucine (Iso.), leucine (Leu.), tyrosine (Tyr.), phenylalanine (Phe.), histamine (His.), and arginine (Arg.), and the contents of the two sour-tasting amino acids, i.e. asparagine (Asp.) and glutamate (Glu.), of the experimental groups 1 and 2 are lower than those of the control group. Among them, the contents of valine and glutamate in the experimental group 2 are only about half those of the control group, which exhibits significant reduction.

Figure 4:
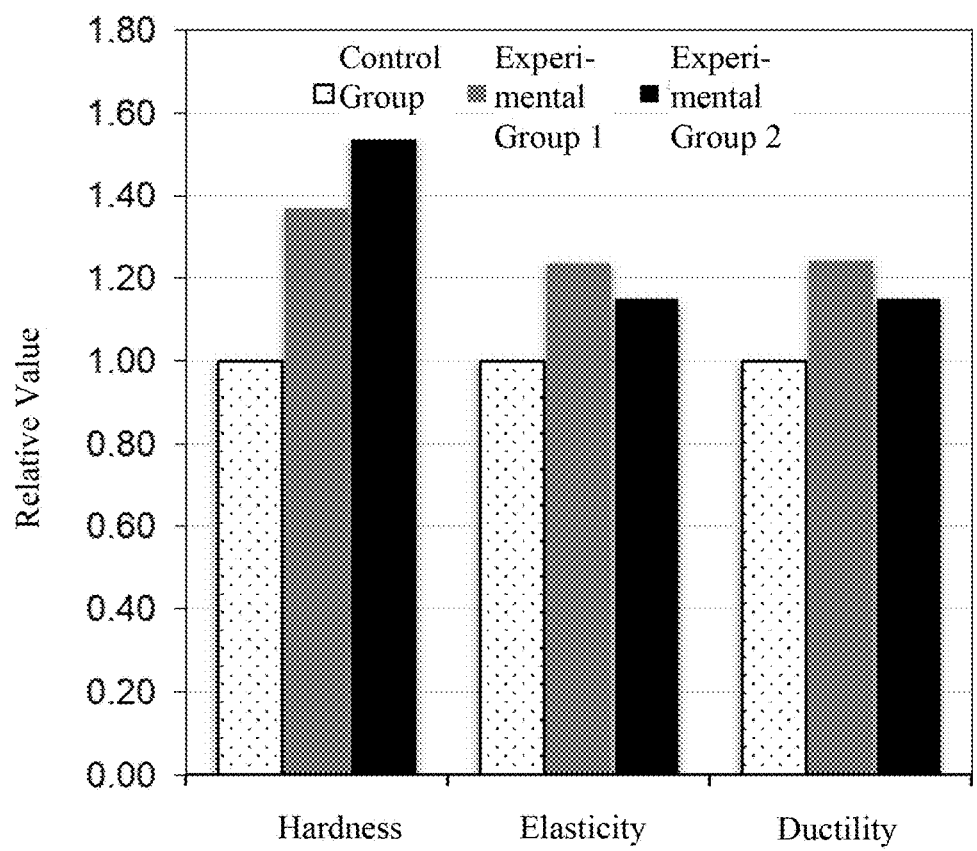
FIGS. 4 and 5 show the hardness, elasticity and ductility of the sturgeon meat.
Figure 5:
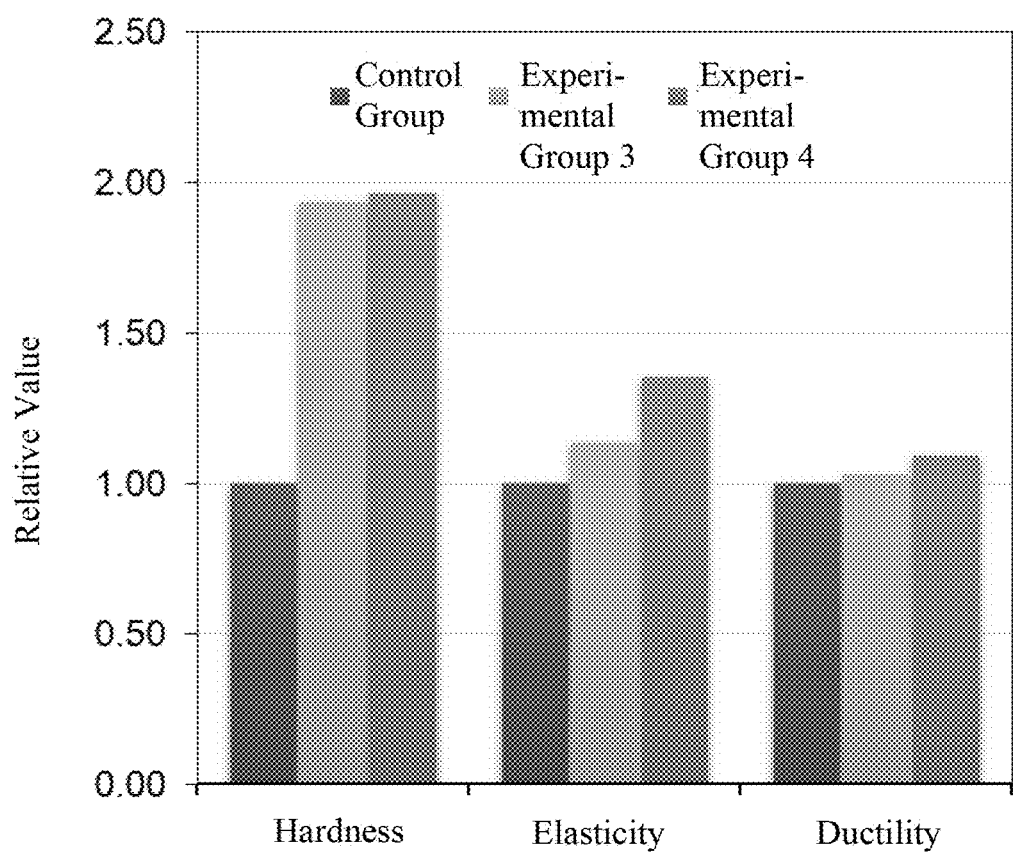

In addition, FIGS. 4 and 5 also show that, compared with the control group, the meat quality of the experimental groups 1, 2, 3, and 4 is significantly improved.

The foregoing results are also reflected in the consumer evaluation shown in Table 1 below. This evaluation is based on the sensory evaluation of 25 consumers using the nine-point method for the smell, taste, mouthfeel and overall preference of sturgeon sashimi. Based on this evaluation, the sashimi of the experimental groups 1 and 2 are better than those of the control group on all the factors of smell, taste, mouthfeel and overall preference, which is consistent with the aforementioned physical properties and amino acid test results.

TABLE 1

| Group | Smell | Taste | Mouthfeel | Overall |
| --- | --- | --- | --- | --- |
| Experimental group 1 | 6.2 | 6.4 | 6.3 | 6.6 |
| Experimental group 2 | 5.9 | 6.2 | 6.6 | 6.2 |
| Control group | 5.5 | 5.7 | 5.9 | 5.8 |

What is claimed is:

1. A method for improving the quality of sturgeon meat, comprising the following steps:
    cultivating sturgeons in freshwater til the sturgeons reach sexual maturity and each of the sturgeons has at least 1 kg of weight; and
    acclimating the cultivated sturgeons for at least 2 weeks in a mixed saline water having a salinity between 10‰ and 20‰ while a mixed-saline-water temperature of the mixed saline water is maintained below 20° C.; wherein the mixed saline water is a mixture of deep seawater and fresh water.

2. The method for improving the quality of sturgeon meat of claim 1, wherein a dissolved oxygen content of the mixed saline water is 5-7 mg/L.

3. The method for improving the quality of sturgeon meat of claim 1, wherein the mixed saline water is a mixture of the deep seawater and groundwater.

4. The method for improving the quality of sturgeon meat of claim 1, wherein the mixed saline water is a mixture of the deep seawater and tap water dechlorinated with activated carbon.

5. The method for improving the quality of sturgeon meat of claim 1, wherein a salinity of the deep seawater is 34-35‰ and a deep-seawater temperature thereof is 4-17° C.

6. The method for improving the quality of sturgeon meat of claim 1, wherein a fresh-water temperature of the fresh water is 24-28° C.

\* \* \* \* \*